United States Patent [19]

Cheu et al.

[11] Patent Number: 5,670,272
[45] Date of Patent: Sep. 23, 1997

[54] BATTERY PACKAGING FOR FLAT CELL BATTERIES HAVING A COMPRESSING MATERIAL FOR THE CELL STACK

[75] Inventors: S. Scot Cheu; Russell D. Moulton, both of San Jose, Calif.

[73] Assignee: Valence Technology, Inc., Henderson, Nev.

[21] Appl. No.: 221,437

[22] Filed: Mar. 31, 1994

[51] Int. Cl.⁶ .................................... H01M 6/12
[52] U.S. Cl. ................. 429/162; 429/163; 429/191; 429/192; 429/210; 429/218
[58] Field of Search ........................ 429/152, 153, 429/127, 162, 163, 218, 191, 192, 210

[56] References Cited

U.S. PATENT DOCUMENTS

| | | | |
|---|---|---|---|
| 3,630,783 | 12/1971 | Przybyla | 136/107 |
| 3,937,635 | 2/1976 | Mead te al. | 136/83 R |
| 4,028,479 | 6/1977 | Fanciullo et al. | 429/152 |
| 4,060,669 | 11/1977 | Fanciullo | 429/152 |
| 4,060,670 | 11/1977 | Tamminen | 429/154 |
| 4,080,728 | 3/1978 | Buckler | 29/623.4 |
| 4,098,965 | 7/1978 | Kinsman | 429/153 |
| 4,105,807 | 8/1978 | Arora | 427/126 |
| 4,137,627 | 2/1979 | Kinsman | 29/623.4 |
| 4,152,825 | 5/1979 | Brunneau | 29/623.2 |
| 4,207,389 | 6/1980 | Gunther et al. | 429/164 |
| 4,209,479 | 6/1980 | Gunther et al. | 264/104 |
| 4,233,371 | 11/1980 | Dorrestijn | 429/152 |
| 4,429,026 | 1/1984 | Bruder | 429/152 |
| 4,477,545 | 10/1984 | Akridge et al. | 429/191 |
| 4,507,857 | 4/1985 | Epstein et al. | 29/623.2 |
| 4,525,439 | 6/1985 | Simonton | 429/162 |
| 4,547,438 | 10/1985 | McArthur et al. | 429/82 |
| 4,664,993 | 5/1987 | Sturgis et al. | 429/178 |
| 4,752,540 | 6/1988 | Chua et al. | 429/56 |
| 4,816,354 | 3/1989 | Tamminen | 429/162 |
| 4,883,726 | 11/1989 | Peled et al. | 424/120 |
| 4,887,348 | 12/1989 | Tamminen | 29/623.2 |
| 4,911,993 | 3/1990 | Turley et al. | 429/27 |
| 4,927,717 | 5/1990 | Turley et al. | 429/27 |
| 4,997,732 | 3/1991 | Austin et al. | 429/153 |
| 5,008,161 | 4/1991 | Johnston | 429/7 |
| 5,066,555 | 11/1991 | Tamminen | 429/121 |
| 5,089,027 | 2/1992 | Rossoll et al. | 29/623.2 |
| 5,409,787 | 4/1995 | Blanyer et al. | 429/66 |

*Primary Examiner*—John S. Chu
*Attorney, Agent, or Firm*—James Hsue; Karen Perkins

[57] ABSTRACT

In order to maintain electrical contact between the anode, cathode and electrolyte layers in an electrochemical cell, a layer of material under tension is wrapped around the cell so that the material compresses the layers together to ensure sufficient electrical contact. Alternatively, a metal, foam or inflatable gas spring is employed in a housing structure containing the electrochemical cell to apply a compressive force to achieve the same result.

2 Claims, 5 Drawing Sheets

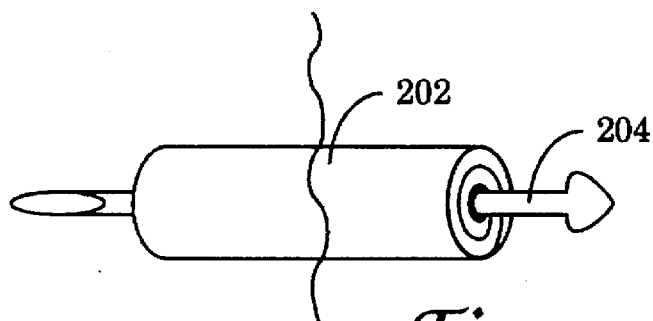
*Figure 7A*
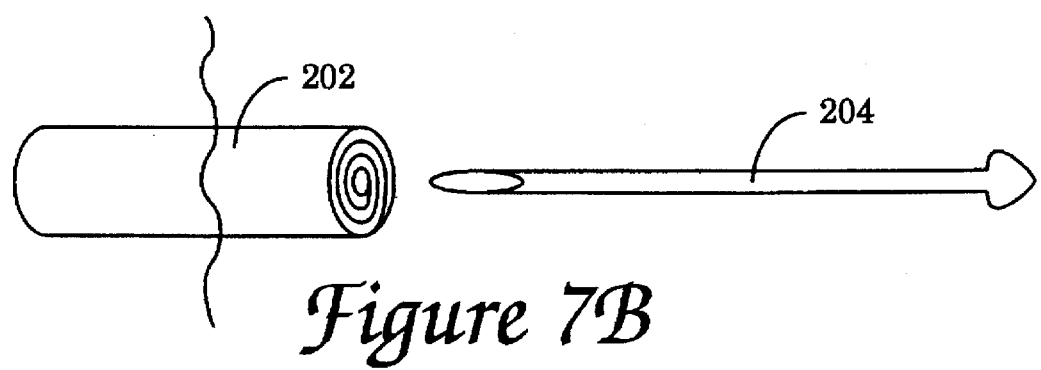
*Figure 7B*
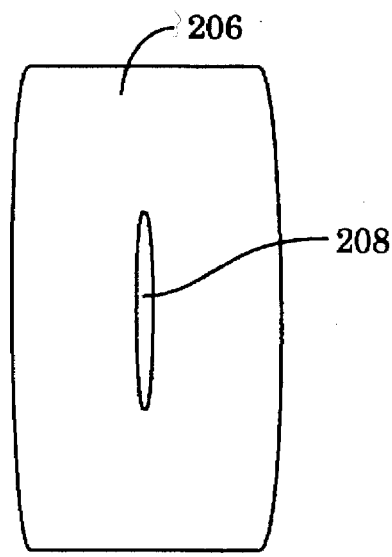 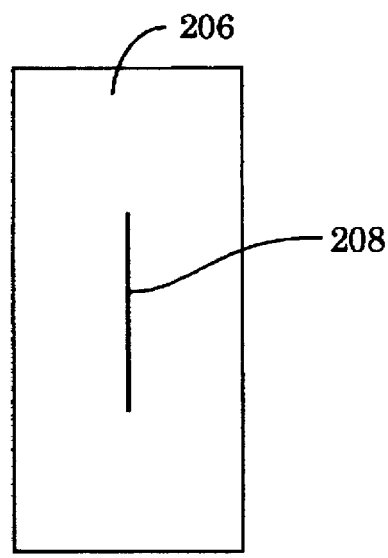
*Figure 8A*  *Figure 8B*

BATTERY PACKAGING FOR FLAT CELL BATTERIES HAVING A COMPRESSING MATERIAL FOR THE CELL STACK

BACKGROUND OF THE INVENTION

The present invention relates to the manufacture of battery assemblies and more specifically solid state packaging for flat cell batteries which provide a compressing means for the cell stacks.

Lithium cells are the newest of the commercially available battery cells. They are higher in energy density per unit weight than silver oxide, mercury or alkaline dry cells and are one of the best performers at very high and low temperatures. Lithium cells also have a longer shelf life than many other batteries and thus have been the choice for many in battery design. A typical lithium flat cell battery includes a lithium anode, a transition metal oxide polymer composite cathode, and a solid or liquid electrolyte which includes a dissolved lithium salt. These batteries are well-known in the art and examples of such are set forth in U.S. Pat. Nos. 4,997,732 to Austin et al. and 4,207,389 to Gunther et al.

Numerous technological problems are encountered, however, in the construction of solid state electrochemical cells, particularly in the establishment of anode/electrolyte interfaces. Failure to establish satisfactory interfaces may manifest itself in high cell impedance and poor discharge performance. The low electrode impedances required for good performance of electrochemical cells can be achieved by bringing the solid surface of the electrode into intimate contact with the solid electrolyte. A common method used to secure good contact is to seal the electrolyte and electrode under vacuum so that compression of the battery cell is achieved by atmospheric pressure.

U.S. Pat. No. 4,997,732 by Austin et al. describes a known method of compressing the stacks of a battery cell. A layer of insulating envelope sealed around the battery cell under a vacuum enables the layer to adhere to the laminar cell to prevent the cell from moving within the sealed enclosure. The vacuum sealed cell envelope prevents delamination of the component layers. The vacuum inside the cell layers results a pressure differential across the envelope so that the atmospheric pressure brings the electrodes into intimate contact with the electrolyte.

Problems with this solution occurs if the vacuum inside the cell envelope is reduced. If the pressure differential across the envelope is reduced substantially, the pressure differential applied to the cell components will no longer be adequate for producing the compression force needed to insure component contact. Vacuum reduction is not uncommon and may occur for a number of reasons. For example, vacuum reduction may occur from gas formation due to impurities inside the cell envelope or from leakage of the envelope due to puncture.

In devices where the vacuum is successfully maintained, other problems may still occur. The vacuum inside the sealed packaging producing the pressure differential also acts as a driving force to push outside air into the cell when the envelope is punctured. Because metallic lithium is reactive with all environmentally present gases and vapors other than "Noble gases," it becomes particularly susceptible to contamination in the above embodiment.

SUMMARY OF THE INVENTION

The object of the present invention is to eliminate the above drawbacks and to provide a novel and more reliable method of applying pressure to cell components. The invention is based on the idea of providing a means of compressing the electrochemical cells in a battery which is independent of atmospheric pressure.

One aspect of this invention is directed towards a lithium cell assembly, comprising a laminar battery that includes an anode layer, a cathode layer, and an ionically conductive electrolyte layer between the anode and cathode layers, said assembly also comprising a layer of material under tension surrounding and in contact with the battery, so that it applies pressure which holds together the laminar battery and compresses it to insure sufficient contact between the electrolyte and anode and cathode layers. In one embodiment, the material may be in either film or tube form. In another embodiment, the battery assembly further comprises a housing with chamber therein containing the battery and the material under tension. In still another embodiment, the battery assembly is vacuum sealed or sealed with an inert gas.

A second aspect of this invention is directed towards a lithium cell assembly, comprising a laminar battery including an anode layer, a cathode layer, and an ionically conductive electrolyte layer between the anode and cathode layers. The assembly includes a sealed housing for housing the battery and a spring element in the housing structure and in contact with the battery so that the element and the structure apply pressure which holds together the laminar battery and compresses it to insure sufficient contact between the electrolyte and anode and cathode layers. In one embodiment, the cell assembly further comprises a floating panel structure which is in contact with the spring element and laminar battery. In the embodiments, the spring element may either be a coil spring, leaf spring, wave washer spring, a form of a polymer foam spring or an inflatable air spring.

A third aspect of this invention is directed towards a lithium cell assembly, comprising a laminar battery having an anode layer, a cathode layer, and an ionically conductive electrolyte layer between the anode and cathode layers. The assembly further comprises a housing structure containing the battery and a nonconductive spring element in the structure and in contact with the battery. The spring element applies a compressive force to said the battery to insure sufficient contact between the electrolyte and anode and cathode layers. In one embodiment, the cell assembly further comprises a floating panel structure which is in contact with the spring element and laminar battery. In the embodiments, the spring element may either be a coil spring, leaf spring, wave washer spring, a form of a polymer foam spring or an inflatable air spring.

Another aspect of this invention is directed towards the method of manufacturing an electrochemical cell battery with a heat shrinkable wrap packaging. The steps include wrapping the electrochemical cell unit with a heat shrinkable material and heating the material so that the material tightens around the cell producing a compressive force on it. The compressive force will insure contact between the cell components and will be independent of the atmospheric pressure surrounding it.

Another aspect of this invention is directed towards the method of manufacturing an electrochemical cell battery with a compressive spring element. The steps include inserting a laminar battery into a housing structure having an opening and a lid, placing a spring element in contact with the laminar battery and closing the opening with said lid so that it applies a compressive force to the battery so that sufficient contact between the electrolyte and anode and cathode layers is provided. Method steps of sealing the housing and flushing the housing structure with inert gas as well of placing a floating panel structure in between the cell and spring element may also be included.

BRIEF DESCRIPTION OF THE DRAWINGS

The above and other features and aspects of the present invention will become more apparent upon reading the following detailed description in conjunction with the accompanying drawings, in which:

FIGS. 7A, 7B are schematic views of one embodiment of a self closing valve.

FIGS. 8A, 8B are schematic views of another embodiment of a self closing valve.

DESCRIPTION OF THE PREFERRED EMBODIMENTS

Figure 1:
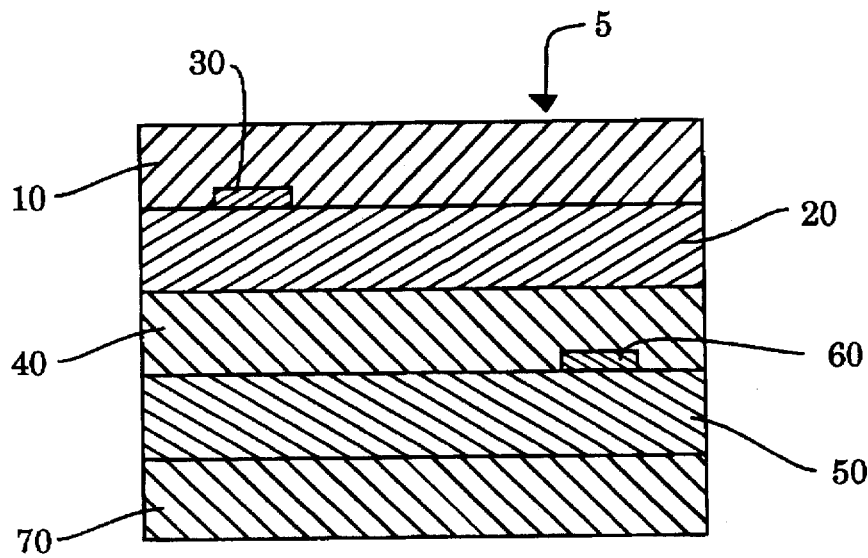
FIG. 1 is a cross-sectional view of a conventional lithium flat cell.

In describing the invention illustrated in the drawings, specific terminology will be resorted to for clarity. However, the invention is not intended to be limited to the specific terms so selected, and it is to be understood that each specific term selected includes all technical equivalents which operate in a similar manner to accomplish a similar purpose.

With reference to FIG. 1, there is shown a cross-sectional view of a typical conventional lithium flat cell 5. The copper plate 10 is an anode current collector. A lithium based anode 20 is in contact on one side with the anode current collector and an anode terminal 30. The anode terminal 30 may comprise either nickel or copper. A solid polymer electrolyte layer 40 is interposed between the anode and cathode layers and lies directly below the anode layer 20. A vanadium oxide based cathode layer 50 lies below the electrolyte layer 40. A cathode terminal 60 in contact with the cathode layer may comprise of either nickel or copper. A cathode current collector 70 in contact with the cathode layer 50 is comprised of aluminum.

Figure 2:
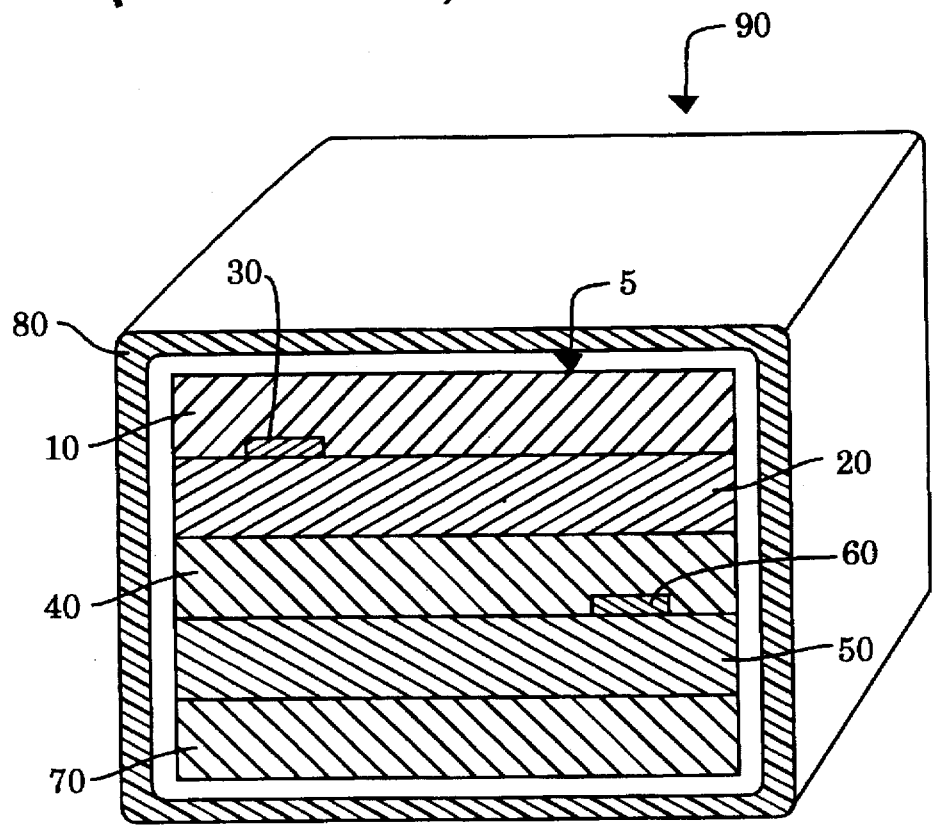
FIG. 2 is a cross-sectional view of an embodiment of the present invention which uses a heat shrinkable material as a means for providing compressive force against the components in the cell assembly to illustrate one embodiment of the invention.

FIG. 2. shows a cross-sectional view of a battery assembly to illustrate a first embodiment of this invention. A heat shrinkable material 80 is wrapped around the electrochemical cell which is shown in FIG. 1. The heat shrinkable material may be for example PVC, PVDC or teflon. The material may either be in tube or film form. Typically when using a tube, material with the appropriate shrink ratio would be fitted around the cell unit. Other suitable types of polyolefin tubes that may be used include the MW, EPS-200, EPS-300, EPS-400 Tubings from 3M Electrical/Electronic, Austin Tex. 78726-9000. After applying heat to the entire tube, the material shrinks to a fraction of (approximately ½ for EPS-200 tubes, ⅓ for EPS-0300 tubes, ¼ for EPS-400 tubes, 1/2.5 for MW tubes referenced above) its original size. The shrinkage is chosen such that a desirable force is applied to the cell stack in the two major sides with which it is in contact. Heat may be applied by running the fitted cell through an oven or by blowing hot air on to it. It is preferred to use a material with low threshold temperature for shrinkage. This would allow shrinkage to occur without having to heat the battery cell for a prolonged period of time at a high temperature. Ideally, shrinkage occurs immediately at relatively low temperatures. EPS-200, EPS-300 and EPS-400 Tubings above have threshold temperatures for shrinkage above 121 degrees Celsius. Even though a heat shrinkable material 80 is used in the embodiment described above, it will be understood that any material that can be placed in tension may be used to apply sufficient compressive forces to hold the different layers of the cell together, thus making vacuum sealing an option, not a requirement.

Figure 3:
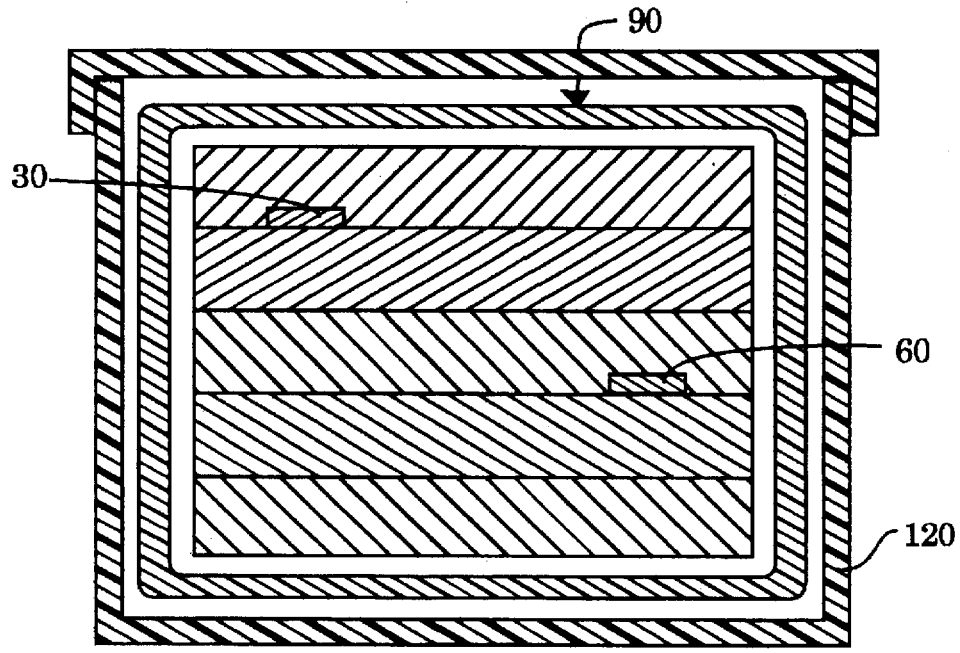
FIG. 3 is a cross-sectional view of the embodiment in FIG. 2 inside an additional protective package.

FIG. 3 shows a cross-sectional view of the wrapped cell unit 90 inserted inside a protective housing structure 120. The housing serves to protect the battery components from contamination by outside air. Although the housing 120 shown in FIG. 3 may be an aluminum battery can, other housings such as cans of different alloys or battery bags of plastic-foil composition may also be used. After inserting the wrapped cell unit inside the protective housing, the housing may be flushed with an inert gas before sealing. The heat shrinkable material alone provides sufficient compressive forces to hold the cells together, thus making vacuum sealing an option, not a requirement. Of course, the terminals 30 and 60 extend out of the structure 120 so that contact can be made between them and outside connectors for drawing power from the battery; such extension and connection are known to those in the art and are not shown in the figures or explained in detail herein.

Figure 4:
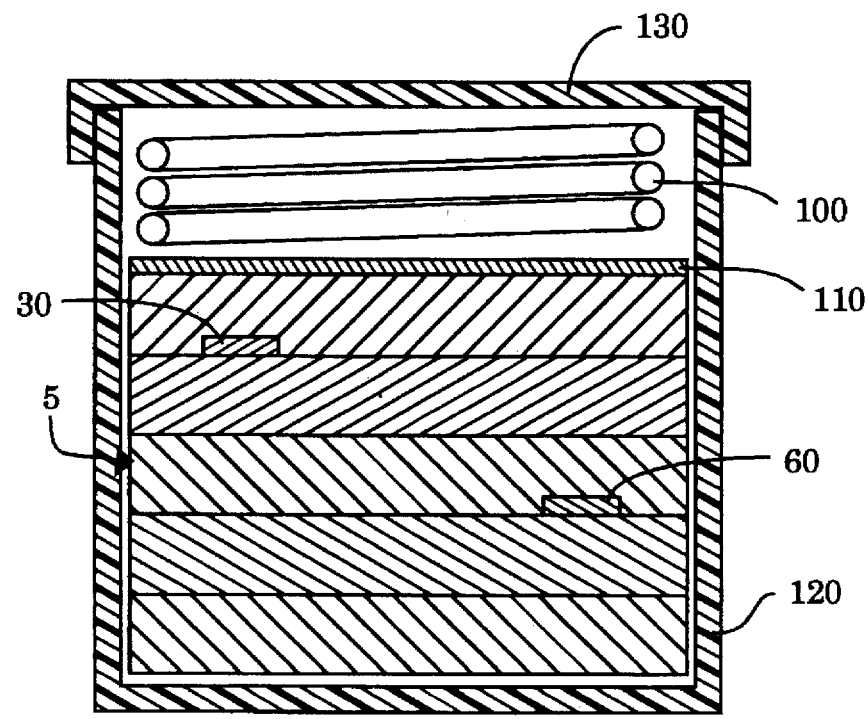
FIG. 4 is a cross-sectional view of a second embodiment of the present invention which uses a coil spring as a means for providing compressive force against the components in the cell assembly.

FIG. 4 shows a cross-sectional view of a second embodiment of this invention. In this second embodiment, a spring element 100 is used to provide compressive forces to hold the battery cells together. In FIG. 4, the lithium flat cell 5 in FIG. 1 is placed in a protective housing or can 120. A floating panel 110 is placed directly on top of the battery cell. The floating panel serves to distribute force evenly across the cell and prevents localization of pressure. The floating panel also prevents the spring from piercing the cell. The panel may be made from a plastic, such as polypropylene, or a metal such as aluminum. A spring element 100 is loosely placed above the floating member 110. The spring element 100 may be of either coil, leaf or wave washer form and may be constructed from steel, an alloy exhibiting high elasticity or a electrically nonconductive material such as polypropylene or anodized aluminum. The protective housing may either be sealed in a vacuum or flushed with an inert gas prior to sealing. When the can is closed, the can top 130 pushes the spring element 100 downwards, compressing the spring, which in turn produces a compressive force on the floating panel 110 and the battery assembly 5. This compressive force is sufficient for holding the anode, electrolyte, cathode and collector layers in the battery cell together and for insuring contact between the layers. Thus, no vacuum sealing of the protective battery can is required. Again, terminals 30, 60 will protrude from can or housing 120 without breaking the seal in a manner known to those skilled in the art.

Figure 5:
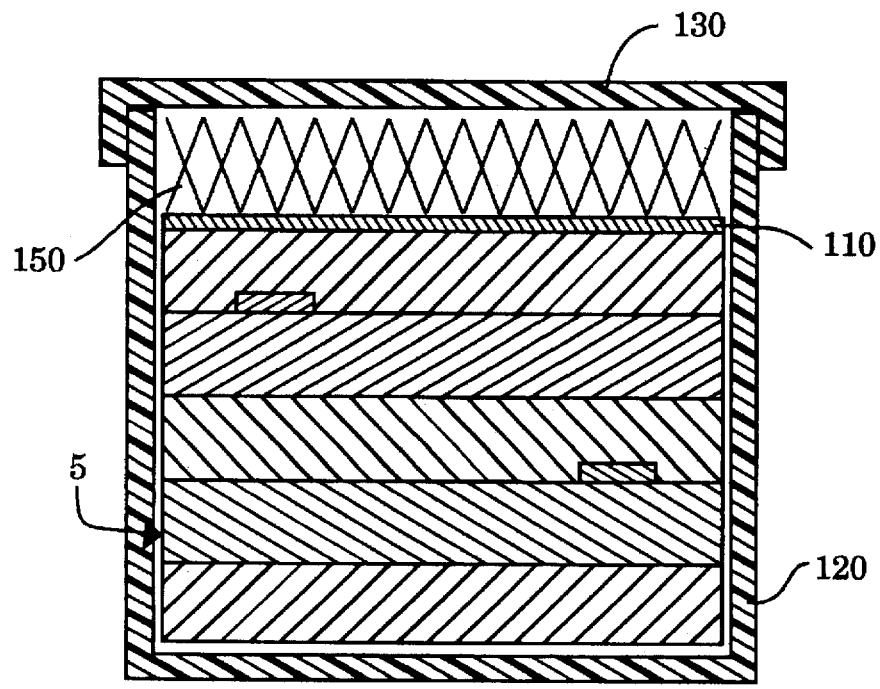
FIG. 5 is a cross-sectional view of a third embodiment of the present invention which uses a polymer foam spring as a means for providing compressive force against the components in the cell assembly.

FIG. 5 shows a cross-sectional view of a third embodiment of the present invention which uses a polymer foam spring element as a means for providing compressive force against the components in the battery assembly. Urethane foam or a similar elastomer is one example of a polymer element that can be used. As in the second embodiment, the third embodiment uses a floating panel 110 to distribute force evenly across a cell assembly 5 placed inside a protective housing 120. A polymer spring element 150 is shown to be placed directly above the floating panel 110. As in the second embodiment, when the can is sealed, the can top 130 pushes the spring element 150 downwards. The element in turn produces a compressive force on the floating panel 110 and the battery assembly 5. The compressive force is sufficient for holding the different component layers of the battery cell together and for insuring contact between them. As in the second embodiment, no vacuum sealing of the protective battery can is required.

Figure 6:
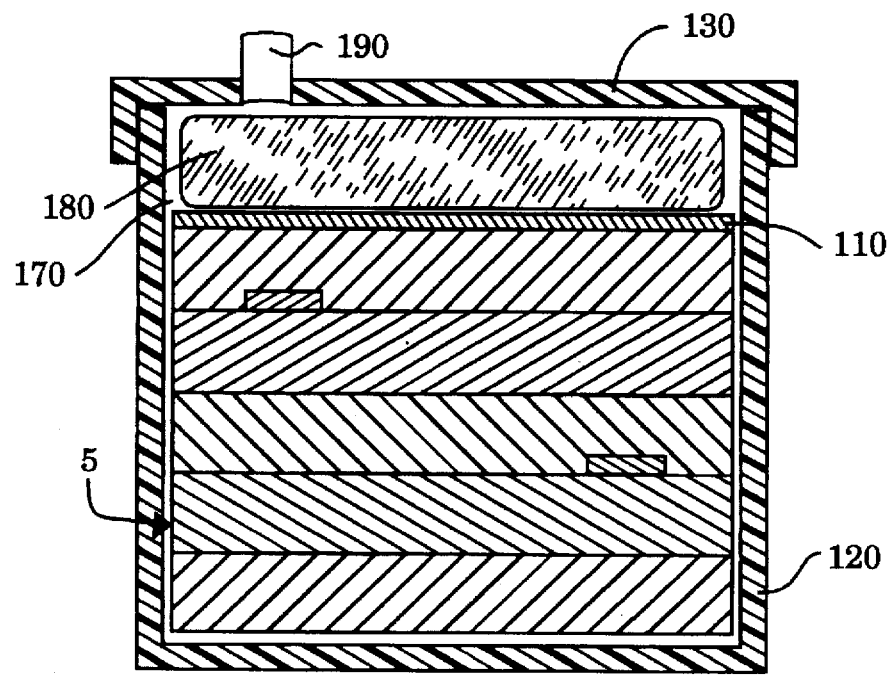
FIG. 6 is a cross-sectional view of a fourth embodiment of the present invention which uses a polymer spring formed from an uncured compound which is injected into a balloon structure located in the dead space between the top of the protective can and the floating panel structure.

FIG. 6 shows a fourth embodiment of the present invention. In this fourth embodiment, an uncured compound 180 is injected into the dead space 170 between the can top 130 of the protective housing structure 120 and the floating panel 110 resting on top of the battery assembly 5, all inside housing structure or can 120. As the compound expands, pressure is exerted on the floating panel 110. In FIG. 6, a floating panel 110 rests above a cell assembly 5 placed in a protective can, housing or packaging 120. After the housing 120 is flushed with an inert gas, the package is sealed. After the package is sealed, an expanding compound 180 is injected through a nozzle 190 through a hole in the can top into the dead space 170 of the package. Typically, the expandable compound is made from two or more elements, one being an activator element. The two elements may be premixed and injected together into the nozzle opening 190, or the two may be injected separately. An example of a compound that may be used is polystyrene, which is known to those in the art. After the injection, the nozzle opening 190 is crimped and soldered. The injected compound will have properties which cause it to, upon curing, expand over time or when heated. As the compound 180 expands, pressure is exerted on the floating panel 110 and the cell assembly. This pressure from the expanding compound is sufficient to hold the different layers in the battery cell together and to insure contact between the layers. Thus, no vacuum sealing of the protective battery can is required.

In yet another embodiment of this invention, an air bag or balloon is deployed in the dead space 170, and the expandable compound described in the fourth embodiment is injected inside the air bag or balloon located in the dead space of the protective can package. The air bag or balloon may be formed using a bladder element inside the package with a neck portion extending through a hole (located such as where nozzle 190 is in FIG. 6) in the can top to outside the housing 120. The injection is made through the neck portion. After the injection is made, sealing of the bag can be accomplished outside the package.

In still another embodiment of this invention, a gas is injected inside an air bag or balloon located in the dead space of the protective can package. The air bag serves as an inflatable spring which exerts a compressive force on the cell member. This force will be sufficient for holding the different component layers of the battery cell together for insuring contact between the layers. In the third embodiment described above in reference to FIG. 5, the foam spring 150 may also be inserted in an air bag or balloon before it is placed in the dead space between the can top 130 and floating panel 110.

In the above embodiments, gas or expandable compound may be injected into the can chamber in a number of different ways. One embodiment of this invention provides a self closing valve on the can top structure, such as at the location of nozzle 190 in FIG. 6 and replacing nozzle 190. Schematic views of a self closing valve is shown in FIGS. 7A, 7B. As shown in FIG. 7A, the valve includes a sheet of rubber 202 wrapped tightly around a needle or pin 204. When the pin or needle is removed, the valve closes. The valve is opened when a needle or pin 204 is inserted into it, allowing gas or compound to be injected through the needle or pin. The wrapped sheet may be inserted into a hole in the can top 130 in place of nozzle 190. Another embodiment of a self closing valve is shown in FIGS. 8A, 8B, which are schematic views of a rubber sheet 206 with a slit 208 therein. When the slit is open, such as when a pin or needle is inserted therein, a gas or compound may be injected through the pin or needle. When the pin or needle is withdrawn, the valve closes. Can top 130 may define a hole therein into which is inserted sheet 206. The valves in FIGS. 7A, 7B, 8A, 8B are known in the art and can be found in various sports equipment, such as basketballs. Another embodiment of this invention provides a small opening in the can top structure with a needle valve of the type described above in reference to FIGS. 7A, 7B, 8A, 8B. Gas or expandable compound is injected through the opening. After injection, the opening automatically closes and can be sealed with an epoxy. Still another embodiment of this invention provides a metallic nozzle opening 190 on the can top. Gas or expandable compound is injected at the opening. After injection, the nozzle is crimped and soldered together.

The first embodiment of the present invention using a heat shrinkable material may be made by wrapping the electrochemical cell unit with a heat shrinkable material, applying heat to the material so that it will shrink (or otherwise causing it to shrink) and apply compressive forces to the cell and inserting the wrapped cell in a housing structure.

The spring embodiment of the present invention may be made by inserting a laminar battery into a housing structure, placing a spring element in contact with the laminar battery and closing the housing so that it applies a compressive force to the battery. Alternatively, the spring may be placed into the housing first before the battery is inserted. The housing may also optionally be sealed, either in a vacuum or after flushing the housing with an inert gas.

The steps of vacuum sealing the present invention may include either manufacturing the battery assembly in a vacuum chamber or by evacuating the sealed chamber through one of the valve, opening, or nozzle structures described above, in a manner known to those skilled in the art.

Figure 9A:
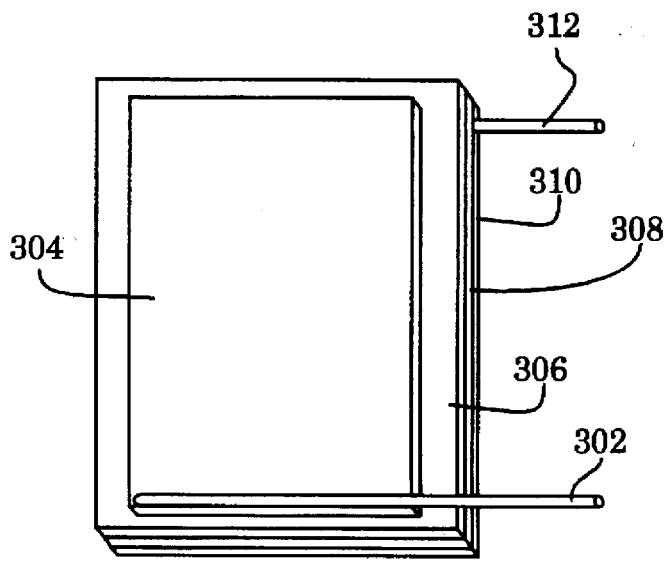
FIG. 9A is a perspective view of a center wire, an anode layer, electrolyte layer, cathode layer, and an insulator layer for forming a cell to illustrate yet another embodiment of the invention.
Figure 9B:
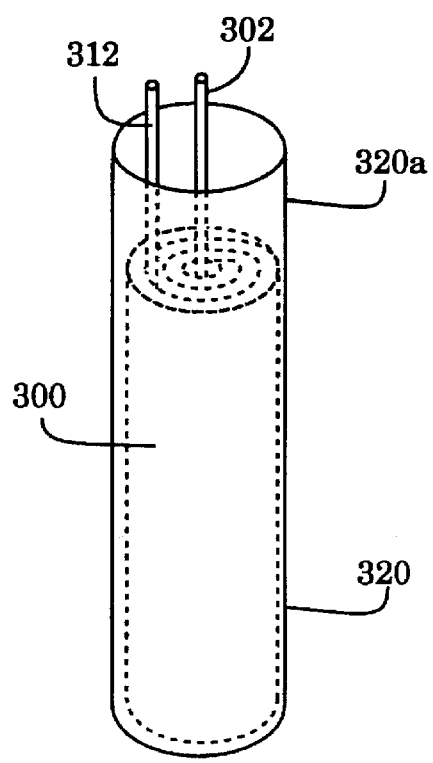
FIG. 9B is a perspective view of the cell of FIG. 9A inserted in a cylindrical material for closing and sealing the cell to illustrate the embodiment of FIG. 9A.

In some of the embodiments shown above, the different anode, electrolyte, cathode and collector layers are shown as flat planar layers. If such layers are sandwiched between two rigid panels and the entire assembly is wrapped in a shrinkable material and the material is shrunk to exert a force on the layers to maintain electrical contact between them, this may cause the layers and the panels to buckle, thereby reducing the areas of contact between different layers which is undesirable. For this purpose, it may be advantageous to employ the embodiment of FIGS. 9A, 9B. FIG. 9A is a perspective view of a center wire terminal 302, an anode layer 304, electrolyte layer 306, cathode layer 308, an insulator layer 310 and cathode terminal 312. FIG. 9A is not drawn to scale. Other layers (not shown) which may be included are the anode and cathode collector layers. The above-described composite sheet of layers is rolled up around wire 302 to form a substantially cylindrical cell 300 as shown in FIG. 9B, where the anode, electrolyte and cathode layers have curved surfaces. Cell 300 is inserted into a cylindrical-shaped shrinkable material 320 which is longer than the cell 300 at extra portion 320a. Extra portion 320a of material 320 is heat sealed or ultrasonically welded around the terminals so as to seal cell 300 inside material 320, while permitting terminals 302, 312 to extend outside material 320. Cylinder 320 is shrunk by an appropriate process such as heating so as to apply pressure and force on battery cell 300 to thereby maintain electrical contact between the different layers of the cell. Tab 312 in contact with the cathode layer 308 serves as the cathode terminal.

It is to be understood that modifications and changes to the preferred embodiments of the invention herein described can be made without departing from the spirit and scope of the invention. For example, it is to be understood that the present invention would work for packaging batteries including multiple cell units stacked one above another as well as for batteries each including a single cell unit, such as shown in the figures. It is also to be understood that the spring embodiments described in FIGS. 4, 5 and 6 may be constructed with the spring element placed below the cell unit and with or without using a floating panel structure.

What is claimed is:

1. A battery assembly comprising:

a housing having a chamber therein containing a laminar battery surrounded by a of heat-shrinkable compressive material, and an inert gas;

a laminar battery having at least one anode layer, one cathode layer and one electrolyte layer between said anode and cathode layers;

a layer of heat-shrink material surrounding and in contact with the laminar battery, said material having been heated to apply compressive pressure to the laminar battery and insure contact between the electrolyte and anode and cathode layers; and an inert gas within said chamber.

2. A battery assembly comprising:

a laminar battery having at least one anode layer, one cathode layer and one electrolyte layer between said anode and cathode layers;

a layer of heat-shrink material surrounding and in contact with the laminar battery, said material having been heated to apply compressive pressure to insure sufficient contact between the electrolyte and anode and cathode layers; and a housing with a chamber therein containing the laminar battery and the compressive layer of heat-shrink material, said housing further including inert gas in said housing chamber.

* * * * *